A. H. Gazlay,

Saddle Tree,

No. 408. Reissued Oct. 28, 1856.

N. PETERS, PHOTO-LITHOGRAPHER, WASHINGTON, D. C.

UNITED STATES PATENT OFFICE.

O. B. NORTH & CO., OF NEW BRITAIN, CONNECTICUT, ASSIGNEES OF A. H. GAZLAY, OF SARATOGA SPRINGS, NEW YORK.

IMPROVEMENT IN HARNESS-SADDLES.

Specification forming part of Letters Patent No. 5,476, dated March 14, 1848; Reissue No. 408, dated October 28, 1856.

*To all whom it may concern:*

Be it known that we, O. B. NORTH & Co., of New Britain, in the State of Connecticut, doing business under the general manufacturing law of said state, verily believe that A. H. GAZLAY, late of Saratoga Springs, in the State of New York, (now deceased,) did invent a new and useful Improvement in Harness-Saddles, of which the following is a full, clear, and exact description, reference being had to the accompanying drawings, making part of this specification, in which—

Figure 1:
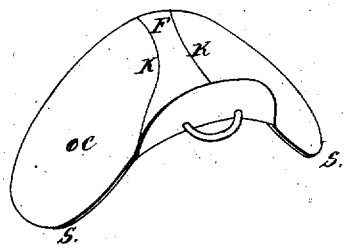
Figure 2:
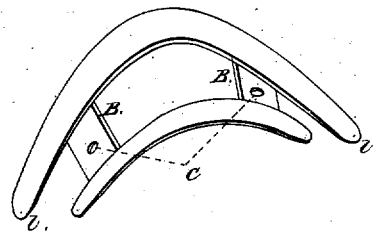
Figure 3:
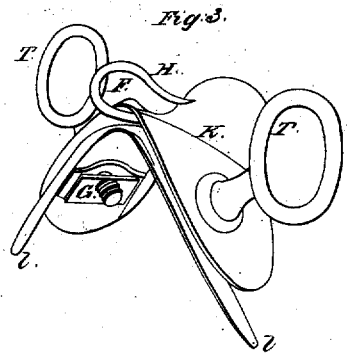
Figure 4:
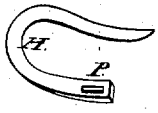

Figure 1 is a perspective view of the upper part of the harness-saddle tree; Fig. 2, a like view of the under part or crotch; Fig. 3, a like view of the said upper and lower parts united, and Fig. 4 the check-hook separate.

The said invention relates to an improvement on the harness-saddle secured to John T. Denniston on the 20th day of November, 1846, in which the leather skirts and jockeys are embraced between the saddle part and crotch-piece below, in which said saddles the required form has been given to the saddle part by casting it of metal; and the said invention of the said ARVIN H. GAZLAY consists in forming the saddle part and the jockey-skirts of metal cast in one piece, whereby any desired form for strength and ornament can be given, and the entire saddle made at much less cost than by any other mode known prior to the said invention.

In the accompanying drawings, Fig. 1 represents the saddle part and jockey-skirts *s s* cast in one piece, of any kind of metal desired, and of any form to suit fancy.

The letters K K represent the lines where the saddle usually joins the jockey-skirts, and C C the holes in the skirts to receive the terrets. At the forward end, F, a tenon (not represented) should be cast on the under surface to fit a mortise, P, in the shank of the check-hook H, Figs. 3 and 4, which is held in place in manner to be presently described.

The crotch is formed of two curved pieces of metal, (represented at Fig. 2,) which are united by two bars, B B, either lapped onto the under surface or the whole cast in one piece. Holes C are formed in the bars B B, which correspond with the holes in the jockey-skirts, (similarly lettered in Fig. 1,) so that the stems in the terrets T T shall pass through the said holes in the jockeys and the bars B B to secure the whole together by nuts G; but, if desired, it will be obvious that the nuts can be dispensed with by tapping the terret-stems directly into the bars B B. The ends *l l* of the front curved piece of the crotch are extended a few inches below the jockey-skirts, to prevent the saddle from tipping forward when pulled by the check-rein on the check-hook H. The crotch does not touch the tree; but they are to be separated by a strap of leather called the "skirt," to the ends of which the girth is buckled. It should be a little wider than the tree, that the pad may be stitched to its edges. Over this skirt another strap called the "bearing-tug" is placed, and the shank of the terrets pass through the leather straps, so that in securing the terrets the whole is secured together without the necessity of stitching. As the mortise of the check-hook fits onto a tenon cast on the under surface of the tree, and the leather passes under the hook, and the crotch under the whole, it is obvious that by drawing the tree and crotch together by the screws on the terrets the hook will be firmly secured and held in place.

The advantages of the said improvement are, the holding of the leather more firmly than by any other plan by reason of securing the whole together by the terrets, which pass through the metal jockey-skirts, the leather, and the metal crotch below. By the use of metallic jockey-skirts cast with the saddle much stitching and labor is saved in the manufacture of this part of the harness, particularly when high finish is required, as the metal parts can be ornamented to any extent required, and at little cost, and by the mode of securing the check-hook and the casting of the staple for the back-strap the cost of construction is greatly reduced, as also the liability to derangement.

What is claimed as new, and desired to be secured by Letters Patent, in the manner of constructing harness-saddles, is—

Making the jockey-skirts and saddle of metal cast in one piece, substantially as and for the purpose specified.

O. B. NORTH & CO.,
By O. B. NORTH,
*President.*
O. B. NORTH.
SAMUEL BRACE.
JUSTUS R. MORGAN.
SAMUEL MORGAN.
A. J. JUDD.

Witnesses:
JOHN J. LEWIS,
S. E. CASE.